United States Patent [19]

Nelsen

[11] 4,355,155
[45] Oct. 19, 1982

[54] THERMOPLASTIC COPOLYESTER ELASTOMER

[75] Inventor: Suzanne B. Nelsen, Bergenfield, N.J.

[73] Assignee: GAF Corporation, New York, N.Y.

[21] Appl. No.: 196,958

[22] Filed: Oct. 14, 1980

[51] Int. Cl.³ .................. C08G 63/54; C08G 63/66
[52] U.S. Cl. .............................. 528/301; 525/444; 525/445; 528/309
[58] Field of Search ............ 528/301, 300, 302, 308, 528/309; 525/408, 411, 444, 445

[56] References Cited

U.S. PATENT DOCUMENTS

| | | | |
|---|---|---|---|
| 3,023,192 | 2/1962 | Shivers, Jr. | 528/301 |
| 3,651,014 | 3/1972 | Witsiepe | 528/309 |
| 3,763,109 | 10/1973 | Witsiepe | 528/301 |
| 3,766,146 | 10/1973 | Witsiepe | 528/309 |
| 3,784,520 | 1/1974 | Hoeschele | 528/301 |
| 4,013,624 | 3/1977 | Hoeschele | 528/300 |
| 4,156,774 | 5/1979 | Buxbaum et al. | 528/300 |
| 4,205,158 | 5/1980 | Hoeschele | 528/300 |
| 4,264,761 | 4/1981 | McGirk | 528/300 |

FOREIGN PATENT DOCUMENTS 2408149 8/1974 Fed. Rep. of Germany ...... 528/300

*Primary Examiner*—Allan Lieberman
*Attorney, Agent, or Firm*—Joshua J. Ward; James Magee, Jr.; J. Gary Mohr

[57] ABSTRACT

Segmented thermoplastic copolyester elastomers containing recurring polymeric long chain ester units derived from phthalic acids and long chain glycols and short chain ester units derived from phthalic acids and a mixture of 1,4-butanediol and 1,4-butenediol.

8 Claims, No Drawings

THERMOPLASTIC COPOLYESTER ELASTOMER

BACKGROUND OF THE INVENTION

Thermoplastic copolyester elastomers in which the polyester is modified with long rubbery segments have long been known in the art and are used in the preparation of molded and extruded articles. Such resins can be used alone or in conjunction with fillers or other resins to provide materials having a variety of properties. It is well known, however, that materials of this general type are subject to thermal degradation. U.S. Pat. Nos. 3,023,192, 3,651,014, 3,766,146, 3,784,520 and 3,763,109 are among prior patents describing elastomers of this type.

SUMMARY OF THE INVENTION

It is an object of the present invention to provide thermoplastic copolyester elastomers of the general type described above, but which have superior thermal stability. In accordance with the invention, a segmented thermoplastic copolyester is provided which consists essentially of a multiplicity of recurring long chain ester units and short chain ester units joined head to tail through ester linkages, said long chain ester units being represented by the formula

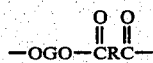  Formula I and said short chain units being represented by the formula

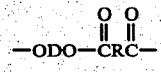  Formula II where G is a divalent radical remaining after the removal of the terminal hydroxyl groups from a difunctional polyether glycol having a molecular weight in the range from about 400 to about 6,000, R is a hydrocarbon radical remaining after removal of the carboxyl groups from terephthalic acid or isophthalic acid, and D is a divalent radical remaining after removal of hydroxyl groups from 1,4 butanediol or 1,4 butenediol; provided (a) said short chain segments amount to between about 30% and about 85%, preferably 45–65% by weight, of the copolyester, and (b) between about 10% and about 40% of the D groups, preferably between about 20% and about 30%, represent divalent radicals remaining after removal of hydroxyl groups from 1,4 butenediol.

In preferred embodiments of the invention, R is a hydrocarbon radical remaining after removal of carboxyl groups from terephthalic acid or from a mixture of terephthalic acid and isophthalic acid containing between about 1 and about 20% isophthalic acid based on the total of terephthalic acid and isophthalic acid.

DETAILED DESCRIPTION OF THE INVENTION

The long chain ester units of the product of the invention are the reaction product of a long chain glycol with terephthalic acid or isophthalic acid. The long chain glycols are polymeric glycols having terminal (or as nearly terminal as possible) hydroxyl groups and a molecular weight between about 400 and about 6,000. Long chain glycols used in preparing copolyesters of the invention are poly(alkylene oxide) glycols and preferably have a carbon to oxygen ratio of between about 2.0 to 1 and about 4.3 to 1. Representative long chain glycols available for use in making product of the invention include poly(ethylene oxide) glycol, poly(1,2- and 1,3-propylene oxide) glycol, and poly(tetramethylene oxide) glycol. Poly(tetramethylene oxide) glycol is a particularly preferred glycol for long chain ester units of the invention.

Short chain segments of product of the invention may be made by reacting a mixture of 1,4 butanediol and 1,4 butenediol with terephthalic acid, or isophthalic acid. In making both the long chain and short chain segments of product of the invention, the use of terephthalic acid is generally preferred with the use of between about 5 and about 20% isophthalic acid based on the total of terephthalic acid and isophthalic acid used being preferred when product of lower flexural modulus is desired.

The terms "terephthalic acid" and "isophthalic acid" as used herein are intended to include the condensation polymerization equivalent of such acids, i.e. their esters or ester-forming derivatives such as acid chlorides and anhydrides, or other derivatives which behave substantially like such acids in a polymerization reaction with a glycol. Dimethyl terephthalate and dimethyl isophthalate are for instance suitable starting materials for elastomers of the invention.

Copolyester product of the invention can be made by conventional ester interchange reaction. A preferred procedure involves heating the dimethyl ester of terephthalic acid or of a mixture of terephthalic and isophthalic acids with a long chain glycol and a molar excess of a mixture of butanediol and butenediol in the presence of a catalyst at 150°–260° C. followed by distilling off of methanol formed by the interchange. Heating is continued until methanol evolution is complete. Depending upon temperature, catalyst and glycol excess, the polymerization is complete within a few minutes to a few hours. This procedure results in the preparation of a low molecular weight pre-polymer which can be carried to a high molecular weight copolyester by distillation of the excess of short chain diol in a conventional polycondensation reaction. Additional ester interchange occurs during this distillation to increase the molecular weight and to randomize the arrangement of the copolyester units. Best results are usually obtained if this final distillation or polycondensation is run at less than 1 mm. pressure and 240°–260° C. for less than 2 hours in the presence of antioxidants such as sym-di-beta-naphthyl-p-phenylenediamine and 1,3,5-trimethyl-2,4-tris (3,5-ditertiary-butyl-4-hydroxybenzyl)benzene. Most practical polymerization techniques rely upon ester interchange to complete the polymerization reaction. In order to avoid excessive hold time at high temperatures with possible irreversible thermal degradation, it is advantageous to employ a catalyst for ester interchange reactions. While a wide variety of catalysts can be used, organic titanates such as tetrabutyl or tetraisopropyl titanate used alone or in combination with magnesium or calcium acetates are preferred. Complex titanates, such as derived from alkali or alkaline earth metal alkoxides and titanate esters are also very effective. Inorganic titanates, such as lanthanum titanate, calcium acetate/antimony trioxide mixtures and lithium and magnesium alkoxides are representative of other catalysts which can be used.

Prepolymers for product of the invention can also be prepared by a number of alternate esterification or ester interchange processes. For example, the long chain glycol can be reacted with a high or low molecular weight short chain ester homopolymer or copolymer in the presence of catalyst until randomization occurs. The short chain ester homopolymer or copolymer can be prepared by ester interchange from either the dimethyl esters and low molecular weight diols, as above, or from the free acids with the diol acetates. Alternatively, the short chain ester copolymer can be prepared by direct esterification from appropriate acids, anhydrides or acid chlorides, for example, with diols or by other processes such as reaction of the acids with cyclic ethers or carbonates. Obviously the prepolymer might also be prepared by running these processes in the presence of the long chain glycol.

Ester interchange polymerizations are generally run in the melt without added solvent, but inert solvents can be used to facilitate removal of volatile components from the mass at low temperatures. This technique is especially valuable during prepolymer preparation, for example, by direct esterification. However, certain low molecular weight diols, for example, butanediol in terphenyl, are conveniently removed during high polymerization by azeotropic distillation. Other special polymerization techniques, for example, interfacial polymerization of bisphenol with bisacylhalides and bisacyl-halide capped linear diols, may prove useful for preparation of specific polymers. Both batch and continuous methods can be used for any stage of copolyester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Although the copolyesters of this invention possess many desirable properties, it is sometimes advisable to stabilize certain of the compositions to heat or radiation by ultraviolet light. This can be done by incorporating stabilizers in the polyester compositions. Satisfactory stabilizers comprise phenols and their derivatives, amines and their derivatives, compounds containing both hydroxyl and amine groups, hydroxyazines, oximes, polymeric phenolic esters and salts of multivalent metals in which the metal is in its lower state.

Representative phenol derivatives useful as stabilizers include 3,5-di-tert-butyl-4-hydroxy hydrocinnamic triester with 1,3,5-tris-(2-hydroxyethyl-s-triazine-2,4,6-(1H, 3H, 5H) trione, 4,4'-bis(2,6-ditertiary-butyl-phenyl),1,3,5-trimethyl-2,4,6-tris (3,5-ditertiary-butyl-4-hydroxylbenzyl)benzene and 4,4'-butylidene-bis(6-tertiary-butyl-m-cresol). Various inorganic metal salts or hydroxides can be used as well as organic complexes such as nickel dibutyl dithiocarbamate, manganous salicylate and copper 3-phenyl-salicylate. Typical amine stabilizers include N,N'-bis (beta-naphthyl)-p-phenylenedianmine, N,N'-bis(1-methylheptyl)-p-phenylene diamine and either phenyl-beta-naphthyl amine or its reaction products with aldehydes. Mixtures of hindered phenols with esters of thiodipropionic acid, mercaptides and phosphite esters are particularly useful.

Additional stabilization to ultraviolet light can be obtained by compounding with various UV absorbers such as substituted benzophenones or benzotriazoles.

The properties of these copolyesters can be modified by incorporation of various conventional inorganic fillers such as carbon black, silica gel, alumina, clays and chopped fiberglass. In general, these additives have the effect of increasing the modulus of the material at various elongations. Compounds having a range of hardness values can be obtained by blending hard and soft polyesters of this invention. The polyesters can be compounded with other resins such as polyvinyl chloride or polybutylene terephthalate.

Elastomers of the invention have superior thermal stability and are especially suited for use in molding various articles such as tires, hoses, drive belts, gears, etc. Such elastomers also crystallize faster than competitive materials and can be made in grades of higher molecular weight. This permits faster molding cycle times and allows the manufacture of blow molding grades of elastomers of the invention.

The following examples are intended to illustrate the invention without limiting the scope thereof.

In the examples presented herein, the following terms have the meanings given below.

DMT—dimethyl terephthalate $B_1D$—1,4 butanediol $B_2D$—1,4 butenediol

DMI—dimethyl isophthalate

Poly(THF)—poly(tetramethylene oxide glycol molecular weight 1,000

PPD—1,3 propanediol

DMH—dimethylcyclohexene dicarboxylate

Goodyear 3125—trade name for 3,5-di-test-butyl-4-hydroxy hydro-cinnamic ticester with 1,3,5-tris-(2-hydroxy ethyl-s-triazine-2,4,6-(1H, 3H, 5H) trione TPT—tetra isopropyl titanate GT—weight percent of short chain ester units of formula II in the elastomer of the invention.

Thermal Stability—"extrapolated onset temperature" (°C.) measured as described in "Guide to Modern Methods of Instrumental Analysis" (Wiley-Interscience, 1972), p. 472.

Melt Stability—percent change in viscosity per minute as measured on a Monsanto rheometer at 225° C.

All elastomers referred to in the following examples were made by placing the indicated ingredients in a one gallon autoclave fitted for distillation and equipped with a mechanical stirrer and nitrogen inlet. A surplus of diol was used. The system was flushed with nitrogen and 17 inches of vacuum was applied during initial heating in which the mass was transesterfied at 200° C. for 30 minutes, by which time methanol distillation had slowed considerably. The temperature of the melt was then raised to the 235°–245° C. range where butenediol was included in the starting materials and to the 245°–250° C. range where butenediol was not included in the original starting materials. The melt was held at this temperature under high vacuum (less than 2 mm) until the desired molecular weight as determined by amperage ratings of about 2.5 was obtained. For examples 3 and 4 the desired final amperage could not be obtained because the material "lined out" and would not build to a high enough molecular weight.

Examples 1–5

In order to evaluate the effect of using a mixture of butenediol and butanediol rather than butanediol only in making elastomers of the type contemplated by the invention, five different elastomers were prepared according to the procedure described above using ingredients and with results as shown in Table I.

TABLE I

|  | Elastomer of Example No. | | | | |
| --- | --- | --- | --- | --- | --- |
|  | 1 | 2 | 3 | 4 | 5 |
| Ingredients (mols in polymer) | | | | | |
| DMT | 0.50 | 0.50 | 0.50 | 0.375 | 0.375 |
| DMI |  |  |  |  | 0.125 |
| B₁D | 0.44 | 0.33 | 0.33 | 0.44 | 0.44 |
| B₂D |  | 0.11 |  |  |  |
| PPD |  |  | 0.11 |  |  |
| Poly (THF) | 0.06 | 0.06 | 0.06 | 0.06 | 0.06 |
| DMH |  |  |  | 0.125 |  |
| Ingredients (grams) | | | | | |
| DMT | 1189 | 1189 | 1189 | 892 | 892 |
| DMI |  |  |  |  | 297 |
| B₁D | 770 | 478 | 517 | 763 | 635 |
| B₂D |  | 155 |  |  |  |
| PPD |  |  | 145 |  |  |
| DMH |  |  |  | 267 |  |
| Poly (THF) | 735 | 735 | 735 | 650 | 735 |
| TPT | 1.4 | 1.4 | 1.4 | 1.4 | 1.4 |
| Goodrich 3125 | 35 | 35 | 35 | 35 | 35 |
| Results | | | | | |
| GT | 58 | 58 | 58 | 58 | 58 |
| Thermal Stability (°C.) | 322 | 350 | 321 | 338 | 325 |
| Melt Stability (Min⁻¹) | −0.855 | −0.085 | −0.84 | −0.33 | −0.615 |

From Table 1 it can be seen that replacing a portion of the butanediol used in Example 1 with butenediol in Example 2, resulted in a noticeable improvement, i.e. from 322° to 350° C. in the decomposition temperature of the elastomer and also an order of magnitude improvement (from −0.855 min⁻¹ to −0.085 min⁻¹) in melt stability. Similar improvements were not noted in Example 3 in which a portion of the butanediol was replaced by propanediol rather than butenediol or in Example 4 in which a portion of the dimethyl/terephthalate was replaced with the dimethyl ester of cyclohexendicarboxylic acid. Likewise, significant improvement was not noted in Example 5 wherein a portion of the dimethyl terephthalate was replaced with dimethyl isophthalate but in which only butanediol was used as the diol.

Example 6–10

These examples illustrate the preparation of materials using varying proportions of butanediol and butenediol as set forth in Table II so that the GT of the resulting elastomers varies from the 58 GT of the elastomers of Examples 1–5. Again it can be seen that in all cases the decomposition temperature and melt stability is significantly better than for the elastomer of Example 1 which does not contain butenediol.

TABLE II

|  | Elastomer of Example No. | | | | |
| --- | --- | --- | --- | --- | --- |
|  | 6 | 7 | 8 | 9 | 10 |
| Ingredients (mols in polymer) | | | | | |
| DMT | 0.50 | 0.50 | 0.50 | 0.50 | 0.50 |
| B₁D | 0.42 | 0.26 | 0.225 | 0.335 | 0.302 |
| B₂D | 0.045 | 0.14 | 0.15 | 0.11 | 0.163 |
| Poly (THF) | 0.035 | 0.10 | 0.125 | 0.053 | 0.035 |
| Ingredients (grams) | | | | | |
| DMT | 1271 | 947 | 908 | 1189 | 1271 |
| B₁D | 758 | 373 | 316 | 573 | 547 |
| B₂D | 82.4 | 196 | 206 | 187 | 288 |
| Poly (THF) | 458 | 959 | 1170 | 650 | 458 |
| TPT | 1.3 | 1.5 | 1.5 | 1.4 | 1.3 |
| Goodrite 3125 | 35 | 35 | 35 | 35 | 35 |
| Results | | | | | |
| GT | 72 | 44 | 37 | 62 | 72 |
| Thermal Stability (°C.) | 355 | 373 | 378 | 348 | 368 |
| Melt Stability (Min⁻¹) | −0.58 | −0.51 | −0.212 | −0.06 | −0.64 |

Examples 11–14

These examples illustrate the use of mixtures of dimethyl terephthalate and dimethyl isophthalate in elastomers of the invention. From Table III it can be seen that these elastomers also exhibit the improved thermal stability and melt stability characteristic of elastomers of the invention.

TABLE III

|  | Elastomer of Example No. | | | |
| --- | --- | --- | --- | --- |
|  | 11 | 12 | 13 | 14 |
| Ingredients (mols in polymer) | | | | |
| DMT | 0.41 | 0.475 | 0.45 | 0.40 |
| DMI | 0.09 | 0.025 | 0.05 | 0.10 |
| B₁D | 0.412 | 0.349 | 0.362 | 0.336 |
| B₂D | 0.073 | 0.136 | 0.108 | 0.084 |
| Poly (THF) | 0.015 | 0.015 | 0.030 | 0.080 |
| Ingredients (grams) | | | | |
| DMI | 260 | 72 | 136 | 55 |
| DMT | 1182 | 1369 | 1222 | 1052 |
| B₁D | 739 | 625 | 630 | 439 |
| B₂D | 128 | 238 | 184 | 143 |
| Poly (THF) | 297 | 297 | 420 | 920 |
| TPT | 1.2 | 1.2 | 1.3 | 1.4 |
| Goodrich 3125 | 35 | 35 | 35 | 35 |
| Results | | | | |
| GT | 82 | 82 | 75 | 50 |
| Thermal Stability (°C.) | 352 | 352 | 346 | 341 |
| Melt Stability (Min⁻¹) | −0.32 | −0.21 | −0.44 | −0.42 |

While the invention has been described above with respect to preferred embodiments thereof, it will be understood by those skilled the art that various changes and modifications may be made without departing from the spirit or scope of the invention.

What is claimed is:

1. A segmented thermoplastic copolyester elastomer consisting essentially of a multiplicity of recurring long chain ester units and short chain ester units joined head to tail through ester linkages, said long chain units being represented by the formula

and said short chain units being represented by the formula

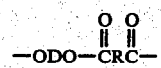

where G is a divalent radical remaining after the removal of the terminal hydroxyl groups from a difunctional polyether glycol having a molecular weight in the range from about 400 to about 6,000, R is a hydrocarbon radical remaining after removal of the carboxyl groups from terephthalatic acid or isophthalic acid, and D is a divalent radical remaining after removal of hydroxyl groups from 1,4 butanediol or 1,4 butenediol; provided,
  (a) said short chain segments amount to between about 30% and about 85% by weight of the copolyester, and
  (b) between about 10% and about 40% of the D groups represent divalent radicals remaining after removal of hydroxyl groups from 1,4 butanediol.

2. Elastomer according to claim 1 wherein G is a divalent radical remaining after removal of terminal hydroxy groups from a difunctional polyether glycol having a carbon to oxygen ratio between about 2.0 and about 4.3 to 1.

3. Elastomer according to claim 1 wherein the short claim segments amount to between about 45 and about 65% by weight of the copolyester.

4. Elastomer according to claim 1 wherein between about 20 and about 30% of the D groups represent divalent radicals remaining after removal of hydroxyl groups from 1,4 butenediol.

5. Elastomer according to claim 4 wherein between about 1 and about 20% of the R groups are hydrocarbon radicals remaining after removal of the carboxyl groups from dimethyl isophthalic acid.

6. Elastomer according to claim 1 wherein G is a divalent radical remaining after removal of terminal hydroxyl groups from poly(tetramethylene oxide)glycol.

7. Elastomer according to claim 1 wherein G is a divalent radical remaining after removal of terminal hydroxyl groups from poly(ethylene oxide)glycol.

8. Elastomer according to claim 5 wherein G is a divalent radical remaining after removal of terminal hydroxyl groups from poly(tetramethylene oxide)glycol.

* * * * *